United States Patent [19]
Howells

[11] 3,807,339
[45] Apr. 30, 1974

[54] GAS-CUSHION VEHICLE
[75] Inventor: John Idris Arthur Howells, Portsmouth, England
[73] Assignee: Vasper Thornycroft Limited, Portsmouth, England
[22] Filed: July 26, 1971
[21] Appl. No.: 165,992

[30] Foreign Application Priority Data
July 29, 1970 Great Britain.................... 36674/70

[52] U.S. Cl............. 114/67 A, 114/144 R, 114/163, 180/117
[51] Int. Cl............................................... B63b 1/34
[58] Field of Search............ 114/67 R, 67 A, 144 R, 114/122, 126, 162, 163, 66.5 H, 61; 180/117, 118; 244/77 D, 78, 83 R

[56] References Cited
UNITED STATES PATENTS

| | | | |
|---|---|---|---|
| 2,576,716 | 11/1951 | Gardiner | 114/66.5 H |
| 2,832,305 | 4/1958 | Bell | 114/126 |
| 3,120,364 | 2/1964 | Stalony-Dobrzanski | 244/77 D |
| 3,141,436 | 7/1964 | Cathers et al. | 114/67 A X |
| 3,230,920 | 1/1966 | Piskorz-Nalecki | 114/162 |
| 3,286,678 | 11/1966 | Bruscaglioni | 114/126 |
| 3,557,734 | 1/1971 | Tann et al. | 114/122 |
| 3,398,716 | 8/1968 | Neilson | 114/61 X |
| 3,541,987 | 11/1970 | Barkley | 114/61 |
| 3,603,534 | 9/1971 | Barltrop | 244/78 |

Primary Examiner—Milton Buchler
Assistant Examiner—Barry L. Kelmachter
Attorney, Agent, or Firm—Norris & Bateman

[57] ABSTRACT

A attitude control system for a water-borne gas-cushion vehicle, having two rigid keel-like members housing water reaction propulsion means, comprising two laterally-spaced control assemblies having water engaging fins adjustable in both directions from a central position of zero incidence and hydraulic actuating means which move the fins in unison or in opposition in response to control means operable manually or automatically by an auto-pilot.

1 Claim, 7 Drawing Figures

PATENTED APR 30 1974

INVENTOR: JOHN IDRIS ARTHUR HOWELLS
ATTORNEYS: NORRIS & BATEMAN

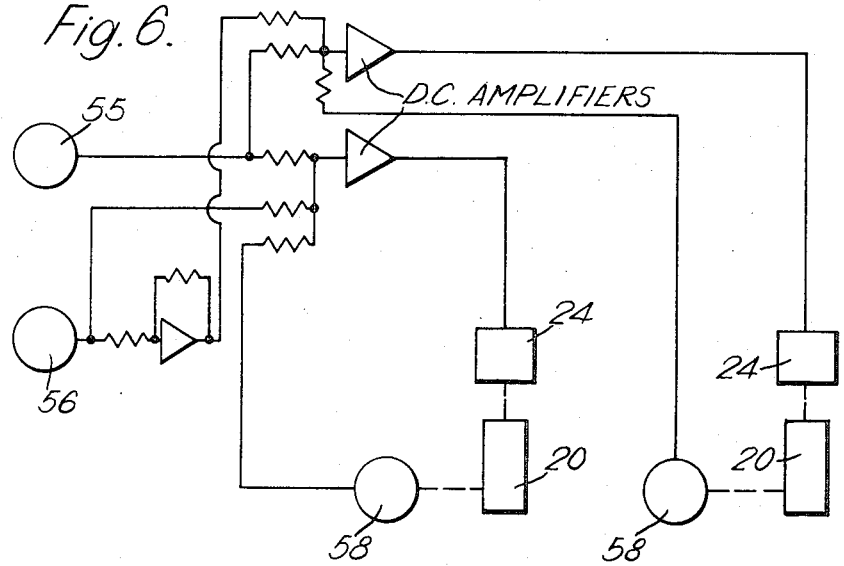
Fig. 6.
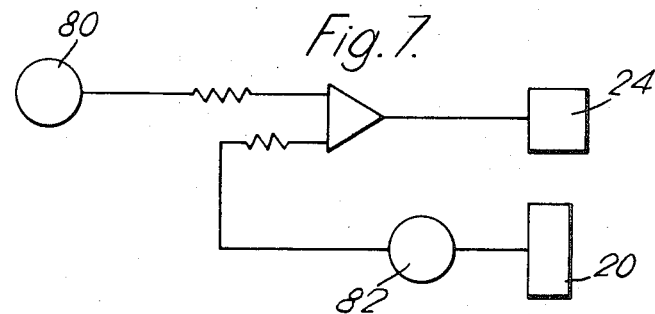
Fig. 7.
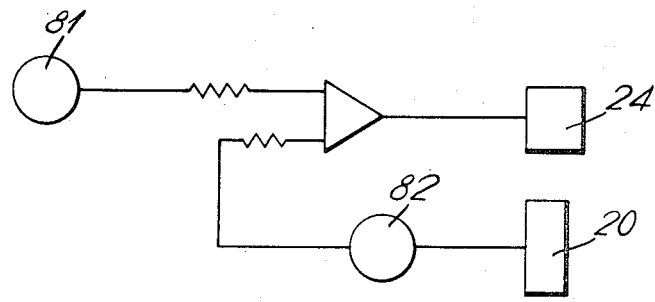

GAS-CUSHION VEHICLE

BACKGROUND OF INVENTION

The invention relates to a gas-cushion vehicle, and more particularly to a gas-cushion vehicle of the kind having laterally spaced rigid members which project below the surface when the vehicle is operating on its cushion over water. Such a vehicle may have, for example, sidewall members which define the cushion space in conjunction with front and rear flexible skirts, or a full flexible skirt defining the cushion space and two parallel skegs or keel-like members depending from the hull within said space.

SUMMARY OF INVENTION

The object of the invention is to improve the attitude control of a gas-cushion vehicle of the kind referred to.

According to the invention, a gas-cushion vehicle has laterally spaced rigid members and at least one control assembly comprising separate rudder and attitude systems, said members and said assembly projecting below the surface when the vehicle is operating on its cushion over water.

BRIEF DESCRIPTION OF DRAWINGS

The invention will now be described, by way of example only, with reference to the accompanying drawings of which:-

FIG. 6 is a diagrammatic arrangement of an alternative electrical control circuit for the attitude control systems of FIGS. 1 and 2; and FIG. 7 is a diagrammatic arrangement of a further alternative electrical control circuit for the attitude control systems of FIGS. 1 and 2.

DESCRIPTION OF PREFERRED EMBODIMENTS

Figure 1:
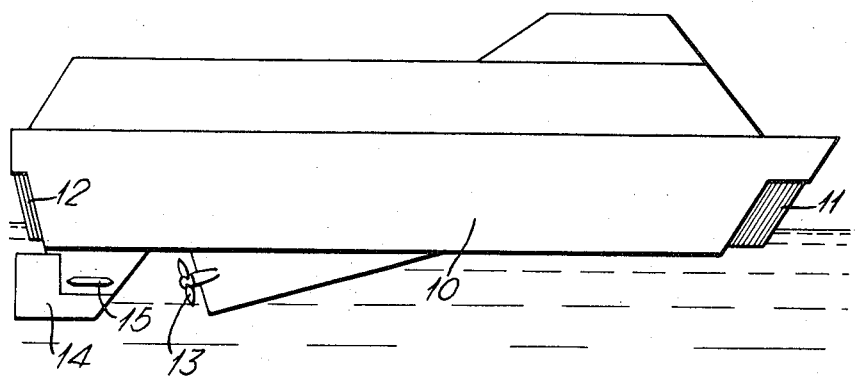
FIG. 1 is a diagrammatic side elevation of a gas-cushion vehicle of the solid sidewall type.
Figure 2:
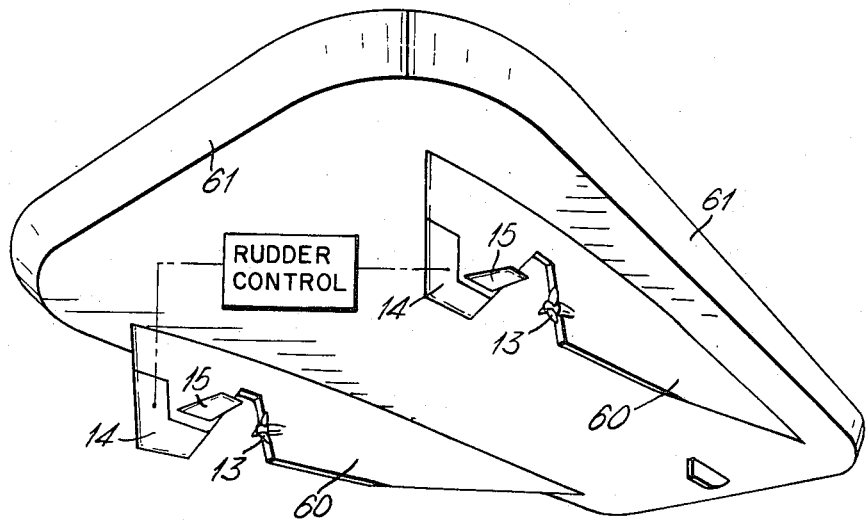
FIG. 2 is a diagrammatic perspective view of the underside of a gas-cushion vehicle of the fully skirted type provided with two skegs each having its own control assembly comprising separate rudder and attitude control systems, the skirt being omitted for clarity.
Figure 4:
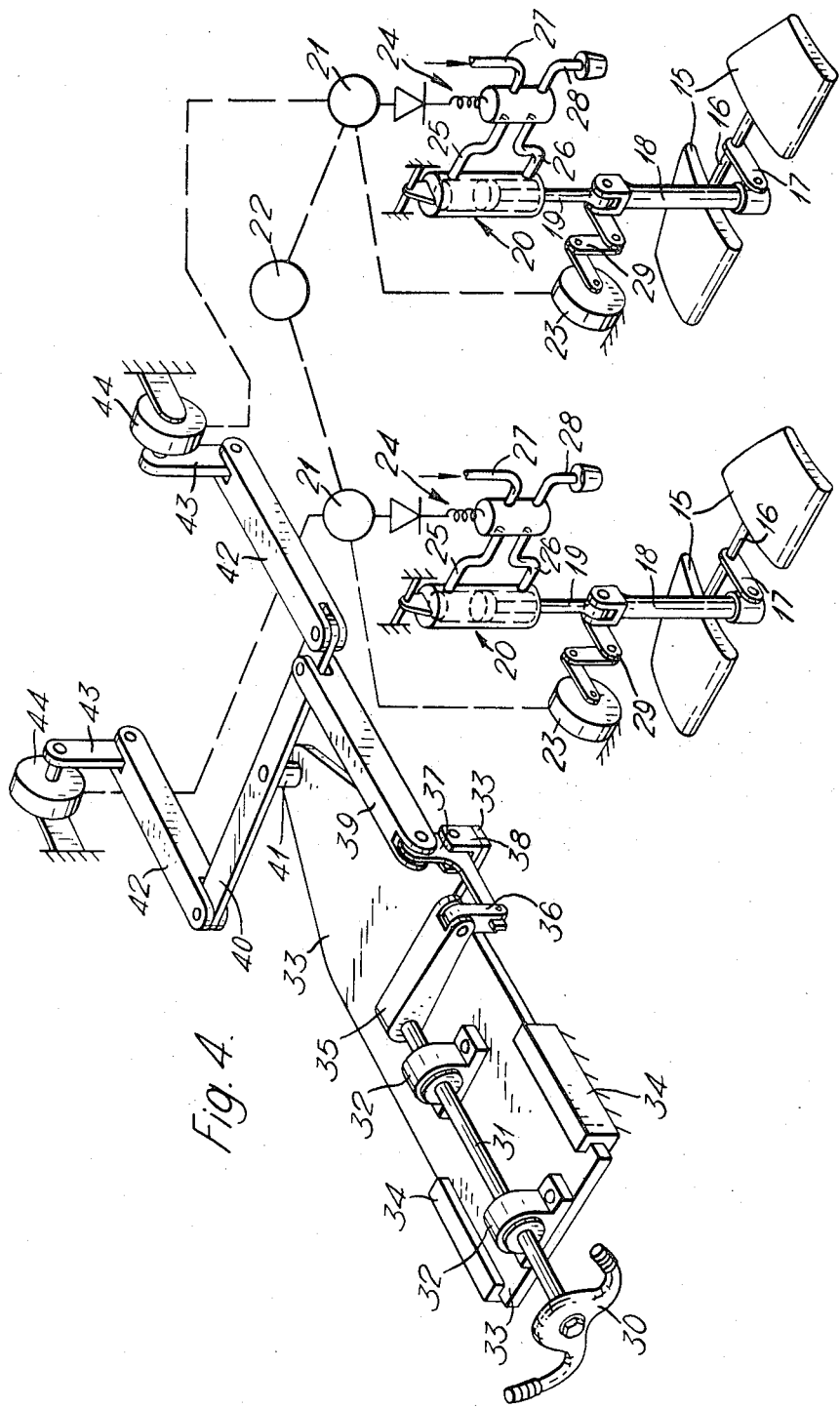
FIG. 4 is a diagrammatic arrangement of actuating mechanism for the attitude control systems of FIGS. 1 and 2.

Referring now to FIG. 1, a gas-cushion vehicle is provided with rigid sidewalls 10 which define the cushion space in conjunction with front and rear flexible skirts 11 and 12 respectively. Each sidewall 10 carries a power-driven variable-pitch water screw 13, and directly aft of said screw there is disposed a rudder 14 pivotally mounted on the sidewall. The rudder is generally L-shaped with the foot of the L pointing forward. FIG. 2 illustrates the separate rudder control which is of any conventional type and the details of which per se do not comprise any part of the invention. Immediately above the foot of its rudder each sidewall is provided with an attitude control system comprising two interconnected fins 15 which project respectively from opposite sides of the sidewall 10. The fins 15 of each attitude control system are rigidly secured to a common shaft 16 (see FIG. 4) mounted in bearings in the sidewalls 10, so as to be movable in unison about a common axis to vary their angle of incidence. For each set of fins 15, an arm 17 is secured at one of its ends to the shaft 16 and is pivotally connected at its other end to one end of a link 18 the other end of which is pivotally connected to a projecting piston rod 19 of a hydraulic piston-and-cylinder assembly 20. The piston of said assembly is positioned at mid-stroke in the cylinder thereof when the fins 15 are in a position of zero incidence. The two hydraulic piston-and-cylinder assemblies 20 are controlled by means including respective phase sensing rectification members 21. Each of the members 21 is adapted to respond to an electrical signal emanating either from a common gyroscopically controlled automatic pilot means 22 or from a common manually operated control means and to an electrical signal emanating from the associated one of two feed-back devices 23, so as to actuate an electro-hydraulic servo valve 24 via an amplifier. Each valve 24 is connected to the upper and lower ends of the cylinder of its associated assembly 20 by pipes 25 and 26 respectively, to a source of oil under pressure by a supply pipe 27 and to sump by an exhaust pipe 28. The valve 24 has a neutral position. When the valve is in its neutral position equal pressure is maintained on both sides of the piston and excess oil is ducted away to sump via the exhaust pipe 28. Displacement of the valve 24 in either direction from its central neutral position unbalances the pressures within the cylinder by directing a proportion of the oil flow to one side of the piston and by drawing oil from the other side of the piston as the remainder of the oil supply passes to exhaust. Displacement of the valve 24 in one direction from its central neutral position causes a proportion of the oil from the supply pipe 27 to flow through the pipe 25 the remainder of the supply flowing to sump through the pipe 28 to draw oil from the cylinder via the pipe 26 whereby the piston in said cylinder is moved downwardly to apply positive incidence to the associated pair of fins 15. Displacement of the valve 24 in the other direction from its central neutral position causes a proportion of the oil from the supply pipe 27 to flow through the pipe 26 the remainder of supply flowing to sump through the pipe 28 to draw oil from the cylinder via the pipe 25 whereby the piston in said cylinder is moved upwardly in its cylinder to apply negative incidence to the associated pair of fins 15. The proportion of oil directed to the cylinder is determined by the amount of displacement of the valve 24. The feed-back devices 23 are control transformers, the outer casing of each being secured to a fixed part of the vehicle and the inner portion being rotated by linkage 29 in response to movement of the piston rod 19. The manually operated control means comprise a control handle 30 secured to one end of a shaft 31 which is rotatably mounted in bearings 32 in such manner that axial movement of said shaft relative to said bearings is prevented. The bearings 32 are mounted adjacent one end of a slidable member 33 located in guideways 34 for movement in a direction parallel to the axis of the shaft 31. An arm 35 secured to the other end of the shaft 31 extends radially therefrom and is pivotally connected to the upper end of a downwardly extending link 36. A bell-crank lever 37 is mounted for pivotal movement about a horizontal axis at right angles to the guideways 34 in a bracket 38 secured to the slidable member 33. One arm of the bellcrank lever 37 is universally connected to the lower end of the link 36 and the other arm is universally connected to one end of a rod 39. The other end of said rod is pivotally connected to a cross-member 40 adjacent one of its ends. The cross-member 40 is mounted midway of its length for pivotal movement in a horizontal plane on an upwardly extending pivot pin 41 secured to the slidable member 33 adjacent its other end. Pivotally connected to each end of the cross-member 40 is a link 42 which extends in a direction generally parallel to the axis of the shaft 31 and has pivotally connected to its other end the lower end of an arm 43 which is connected at its upper end to the inner portion of a synchro transmitter 44 the outer casing of which is secured to a fixed part of the vehicle. Each of the transmitters 44 is connected electrically to one of the phase sensing rectification members 21.

In operation, automatic or manual control of the attitude control system can be selected. When automatic control is selected the automatic pilot means 22 is set to keep the vehicle on an even keel. When the vehicle departs from an even keel signals are transmitted from the means 22 to the phase sensing rectification members 21. According to the voltage of the signal received, each member 21 energises the coils of its associated electro-hydraulic servo valve 24 and the resultant movement of the piston rod 19 projecting from the associated assembly 20 applies positive or negative incidence to the associated pair of fins 15. Said movement of the piston rod 19 actuates the linkage 29 and the feed-back device 23 which in turn imposes a signal upon the phase sensing rectification member 21 to limit the amount of movement of said piston rod by returning the electro-hydraulic servo valve 24 to its neutral position. If the departure from an even keel is in the transverse direction the port and starboard pairs of fins 15 operate in opposition to one another, that is to say positive incidence is applied to one pair of fins and negative incidence to the other pair in order to counteract rolling. If the departure from an even keel is in the longitudinal direction the port and starboard pairs of fins 15 operate in unison with one another to counteract pitching. If the vehicle is subjected to both rolling and pitching the phase sensing rectification members 21 continually adjust the incidence of both pairs of fins 15 in response to the signals received from the automatic pilot means 22 and the feed-back devices 23.

When the fins 15 are to be controlled by the manually operated control means, pitching is counteracted or fore-and-aft trimming is achieved by movement of the control handle 30 in the direction of the axis of its shaft 31 in either direction from a central neutral position in which the fins are in a position of zero incidence. Movement of the control handle 30 forwardly away from the operator moves the slidable member 33, the cross-member 40, both links 42 and arms 43 in unison to cause the two synchro transmitters 44 to transmit identical signals to the phase sensing rectification members 21 which cause both the port and starboard pairs of fins 15 to take up identical positions of positive incidence. Movement of the control handle 30 in the opposite direction from its central neutral position results in the both pairs of fins taking up identical positions of negative incidence. The amount of incidence applied is determined by the amount of movement of the control handle 30 from its central neutral position.

To counteract rolling, or to bank the vehicle to assist in turning it, the control handle 30 is rotated about the axis of its shaft 31 in either sense from a position in which the cross-member 40 lies at right angles to the guideways 34. Rotation of the control handle 30 in a clockwise direction results in the arm 35, link 36, bellcrank lever 37 and rod 39 displacing the cross-member 40 about its pivot pin 41 to move the starboard link 42 in a rearward direction and to move the port link 42 in a forward direction. Thus the signals transmitted from the synchro transmitters 44 to the phase sensing rectification members 21 will be opposite and will result in the port pair of fins 15 being given positive incidence and the starboard pair of fins 15 being given negative incidence. Rotation of the control handle 30 in an anticlockwise direction similarly results in the port pair of fins 15 being given negative incidence and the stardboard pair of fins 15 being given positive incidence. The amount of incidence applied is determined by the amount of angular displacement of the control handle 30. Furthermore, both pitching and rolling of the vehicle can be counteracted simultaneously by movement of the control handle 30 both axially and rotationally with respect to the axis of its shaft 31. Compound movement of the linkage 35, 36, 37, 39, 40 and 42 results in the movements imposed on the arms 43 by axial movement of the control handle 30 being modified by rotational movement of the control handle to increase the displacement of one of the arms 43 and decrease the displacement of the other of said arms. Thus signals transmitted from the synchro transmitters 44 are different and can be continually varied.

Figure 5:
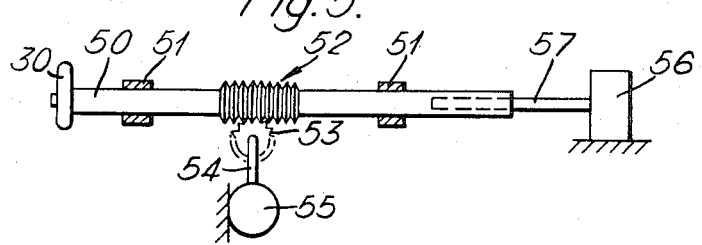
FIG. 5 is a diagrammatic arrangement of an alternative manual actuating mechanism for said systems.

In a modification (see FIG. 5) the control handle 30 is secured to one end of a shaft 50 carried in bearings 51 for axial and rotational movement. The other end of said shaft is provided with an internally splined portion in which a splined shaft 57 can slide freely in an axial direction. The shaft 50 is also provided with a portion 52 having annular ribs which mesh with a toothed gear 53 secured to a shaft 54. Also secured to the shaft 54 is the inner portion of a rotary potentiometer 55 the outer portion of which is secured to a fixed part of the vehicle. Displacement of the shaft 50 in an axial direction rotates the gear 53, the shaft 54 and the inner portion of the potentiometer 55, the intensity of the signal transmitted being dependent on the amount of axial displacement of the shaft 50. The inner portion of a rotary potentiometer 56 is secured to the shaft 57, and its outer casing is secured to a fixed part of the vehicle. The amount of angular displacement of the shaft 50 regulates the signal transmitted by the rotary potentiometer 56. Axial displacement of the control handle 30 actuates the rotary potentiometer 55 which emits a signal to counteract pitching of the vehicle in the same manner as axial displacement of the control handle 30 in the preferred embodiment. Similarly angular displacement of the control lever 30 in the modification is used to counteract rolling or to bank the vehicle. Signals emitted by the two rotary potentiometers 55 and 56 are relayed to the control system shown in FIG. 6, which includes electro-hydraulic servo valves 24, piston-and-cylinder assemblies 20 identical to those of the preferred embodiment, together with resistors and direct current amplifiers designated by the usual symbols and rotary potentiometer feed-back devices 58.

In another modification the transmitters 44 are replaced by two rotary potentiometers 80 and 81, the inner portions of which are activated by the levers 43. The outer portion of the potentiometers being secured to a fixed part of the vehicle. The signals emitted by the two rotary potentiometers 80 and 81 are relayed to the control system shown in FIG. 7 which includes electro-hydraulic servo valves 24, piston-and-cylinder assemblies 20 identical to those of the preferred embodiment, together with rotary potentiometer feed-back devices 82 and resistors and direct current amplifiers designated by the usual symbols.

In a further modification the electro-hydraulic servo valve 24 is replaced with a solenoid operated valve. The solenoid valve has a neutral position in which oil is locked in said cylinder 20, and two operative positions. In one of said operative positions the supply pipe 27 is connected to the pipe 25 and the exhaust pipe 28 is connected to the pipe 26 whereby the piston in said cylinder is moved downwardly to apply positive incidence to the associated pair of fins 15. In the other operative position of the solenoid valve, the supply pipe 27 is connected to the pipe 26 and the exhaust pipe 28 is connected to the pipe 25 whereby said piston is moved upwardly in its cylinder to apply negative incidence to the associated pair of fins 15.

In yet another modification (see FIG. 2), exactly the same arrangement of water-screws 13, rudders 14 and pairs of interconnected attitude control fins 15 is installed on two parallel skegs or keel-like members 60 depending from the underside of a gas-cushion vehicle within the cushion space defined by a full flexible skirt (not shown) secured to bevelled edges 61 formed on the hull.

Figure 3:
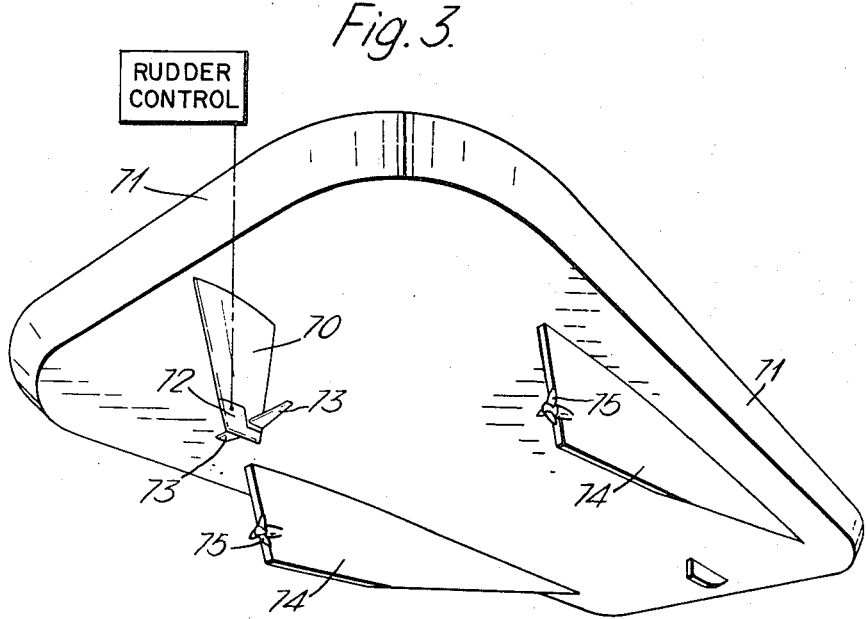
FIG. 3 is a view corresponding to FIG. 2 except that only a single control assembly is provided.

In yet a further modification (see FIG. 3), a single control assembly is mounted on a member 70 depending from an aft, central location on the underside of a gas-cushion vehicle within the cushion space defined by a full flexible skirt (not shown) secured to bevelled edges 71 formed on the hull. Said assembly comprises a single rudder 72 and single unconnected port and starboard stabilizer fins 73 each of which is actuated by one of the piston-and-cylinder assemblies 20 of the preferred embodiment or of the first mentioned modification. Two parallel skegs or keel-like members 74 are provided within the cushion space, each carrying a water-screw 75.

What I claim is:

1. A water-borne gas-cushion vehicle having downwardly projecting laterally-spaced rigid keel-like members and at least one downwardly extending support for a control assembly comprising a movably mounted rudder and a pair of movably mounted attitude control fins mounted in close proximity to said rudder, said vehicle having separate rudder and attitude control systems, said attitude control system including an actuating mechanism comprising two synchro transmitters, manually operated control means movable axially and rotationally to cause variations in signals emitted from the transmitters to respective phase sensing rectification members, a hydraulic system comprising an electro-hydraulic servo valve actuated by each of said rectification members and a piston-and-cylinder assembly actuated by each electro-hydraulic servo valve and adapted to operate one of said control assemblies, a feed-back device capable of transmitting signals from each piston-and-cylinder assembly to the associated rectification member, and said rigid members and said control assembly projecting below the surface of the water when the vehicle is operating on its cushion over the water.

* * * * *